(12) United States Patent
Braunbeck et al.

(10) Patent No.: US 9,102,289 B2
(45) Date of Patent: Aug. 11, 2015

(54) BUMPER ARRANGEMENT AND METHOD FOR ITS PRODUCTION

(71) Applicant: GM GLOBAL TECHNOLOGIES OPERATIONS LLC, Detroit, MI (US)

(72) Inventors: Bardo Braunbeck, Oppenheim (DE); Jens Hartmann, Floersheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/263,847

(22) Filed: Apr. 28, 2014

(65) Prior Publication Data

US 2014/0319860 A1 Oct. 30, 2014

(30) Foreign Application Priority Data

Apr. 27, 2013 (DE) .......................... 10 2013 007 348

(51) Int. Cl.
 *B60R 19/34* (2006.01)
(52) U.S. Cl.
 CPC ....................................... *B60R 19/34* (2013.01)
(58) Field of Classification Search
 CPC ........ B60R 19/34; B60R 19/24; B60R 19/26; B60R 2019/247; B60R 2019/262
 USPC ......................................... 293/132, 133, 155
 See application file for complete search history.

(56) References Cited

U.S. PATENT DOCUMENTS

| | | | | |
|---|---|---|---|---|
| 5,005,887 A * | 4/1991 | Kelman | ........................ | 293/120 |
| 5,100,189 A * | 3/1992 | Futamata et al. | ............. | 293/132 |
| 6,705,653 B2 * | 3/2004 | Gotanda et al. | ............... | 293/132 |
| 6,871,890 B2 * | 3/2005 | Sato et al. | ...................... | 293/155 |
| 7,000,975 B2 * | 2/2006 | Haneda et al. | ................. | 296/132 |
| 7,469,956 B2 * | 12/2008 | Yasuhara et al. | ......... | 296/187.09 |
| 7,926,868 B2 * | 4/2011 | Braunbeck et al. | ...... | 296/187.03 |
| 8,002,338 B2 * | 8/2011 | Yasuhara et al. | ......... | 296/203.02 |
| 8,052,184 B2 * | 11/2011 | Braunbeck et al. | ........... | 293/133 |
| 8,152,211 B2 * | 4/2012 | Klimek | ......................... | 293/102 |
| 8,414,041 B2 * | 4/2013 | Paare et al. | ................... | 293/154 |
| 8,419,116 B2 * | 4/2013 | Boettcher et al. | ........ | 296/203.02 |
| 8,496,287 B2 * | 7/2013 | Matsuura et al. | ........ | 296/187.09 |
| 2006/0249962 A1 * | 11/2006 | Gonzalez et al. | ............. | 293/133 |
| 2011/0193357 A1 * | 8/2011 | Klimek | ......................... | 293/133 |
| 2014/0008924 A1 * | 1/2014 | Han et al. | ...................... | 293/133 |
| 2014/0062106 A1 * | 3/2014 | Han | ............................. | 293/133 |
| 2014/0203578 A1 * | 7/2014 | Kaneko et al. | ................ | 293/133 |
| 2014/0319860 A1 * | 10/2014 | Braunbeck et al. | ........... | 293/133 |
| 2014/0367985 A1 * | 12/2014 | Weil et al. | ..................... | 293/133 |

FOREIGN PATENT DOCUMENTS

| | | |
|---|---|---|
| DE | 19744274 A1 | 4/1999 |
| DE | 102010014999 A1 | 10/2011 |
| DE | 102011051481 A1 | 1/2013 |
| DE | 102011053158 A1 | 2/2013 |
| EP | 0894675 A1 | 2/1999 |

* cited by examiner

*Primary Examiner* — Gregory Blankenship
(74) *Attorney, Agent, or Firm* — Ingrassia Fisher & Lorenz PC

(57) ABSTRACT

A bumper arrangement includes a bumper cross member, at least one crash box, which extends in a longitudinal direction and of which a front end is fastened to the bumper cross member, at least one support element extending along an outside of the crash box obliquely to the longitudinal direction, and a connection portion (8, 9), which is anchored on the crash box and at least on a with respect to the longitudinal direction middle region of the support element.

19 Claims, 3 Drawing Sheets

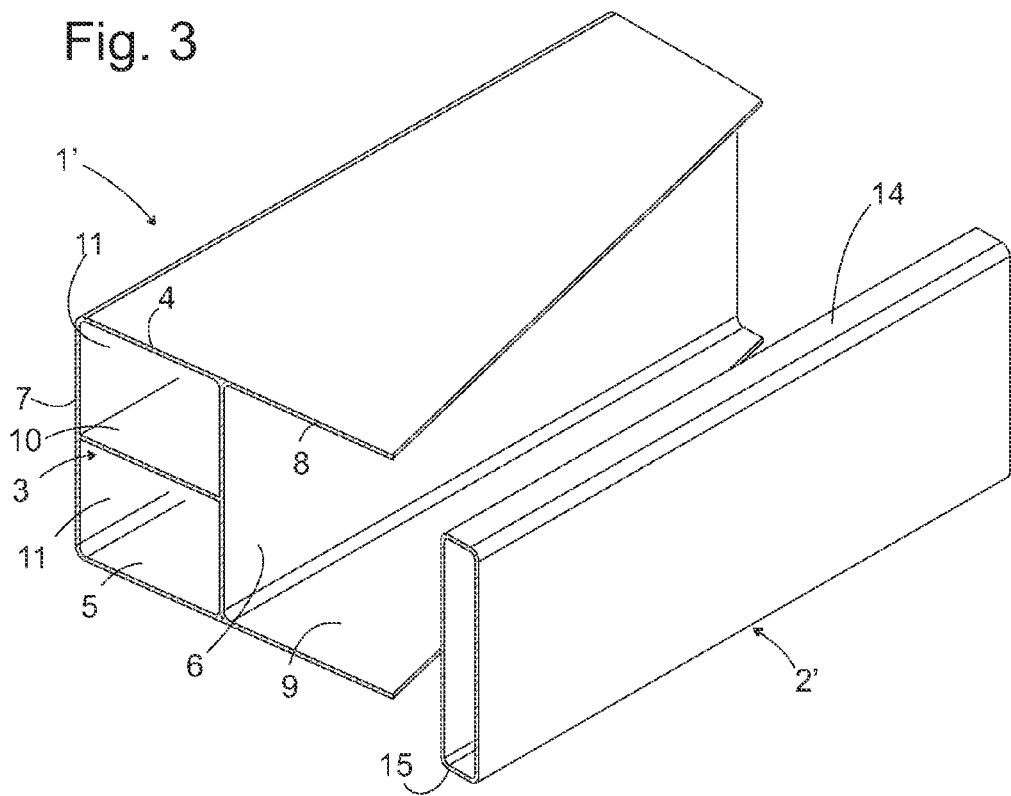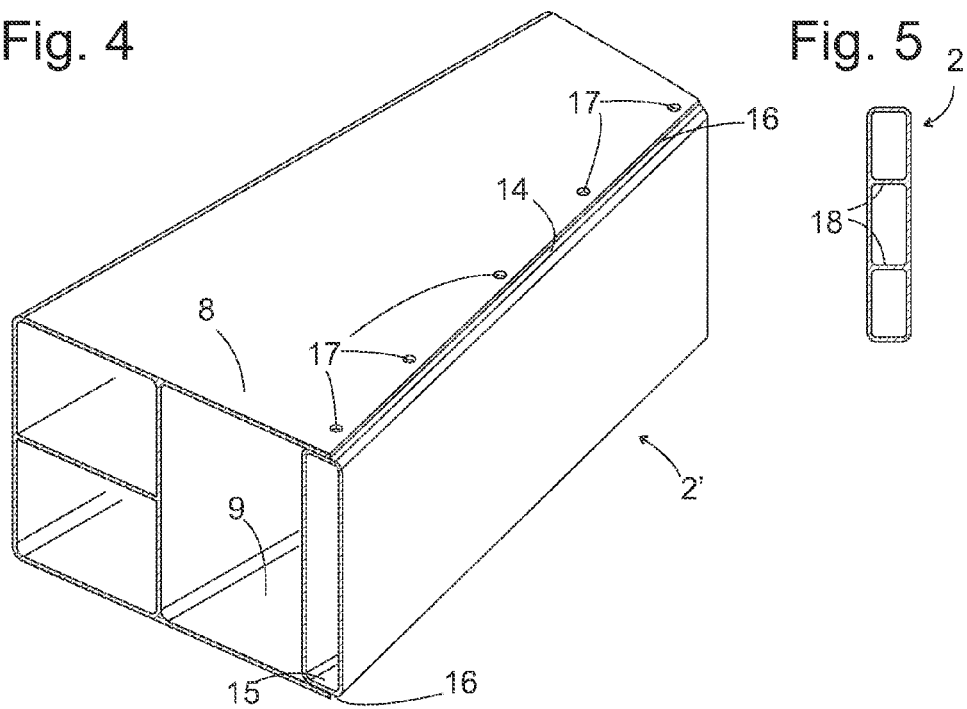

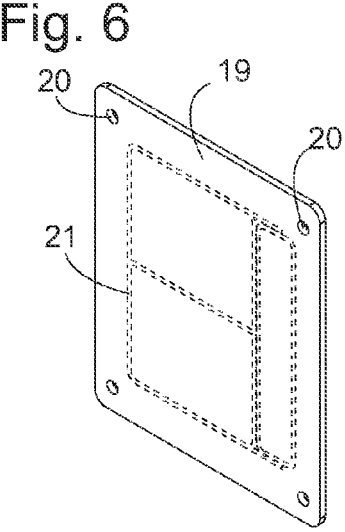
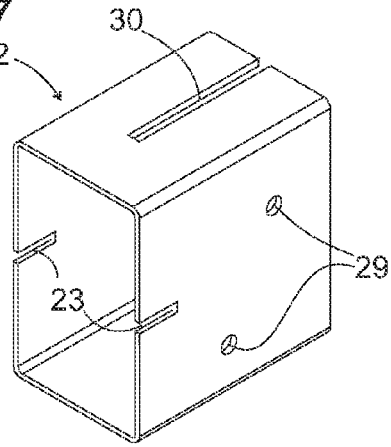
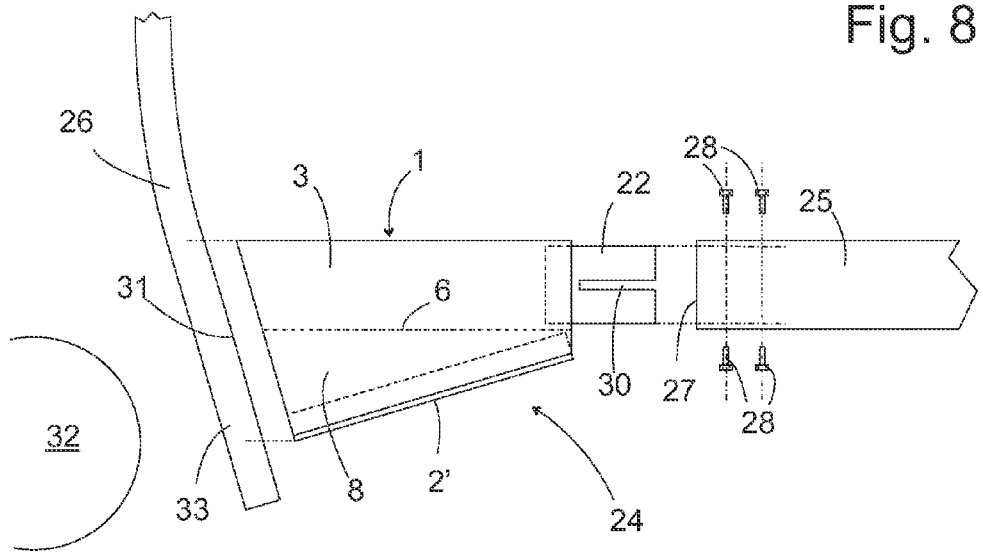
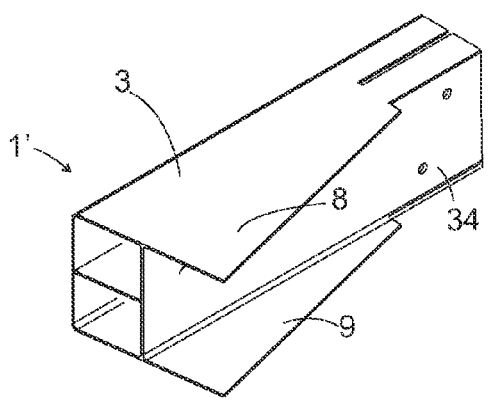

BUMPER ARRANGEMENT AND METHOD FOR ITS PRODUCTION

CROSS REFERENCE TO RELATED APPLICATION

This application claims priority to German Patent Application No. 102013007348.0 filed Apr. 27, 2013, which is incorporated herein by reference in its entirety.

TECHNICAL FIELD

The technical field relates to a bumper arrangement for a motor vehicle and a method for the production of a bumper arrangement.

BACKGROUND

From DE 10 2011 051 481 A1 a bumper arrangement is known, in which, starting out from the back of a bumper cross member, two crash boxes extend in vehicle longitudinal direction in order to be compressed and absorb collision energy in the event of the vehicle colliding with an obstacle. Portions of the bumper cross member projecting over the cross boxes are supported and stiffened through support elements, each of which extends along an outside of the crash box adjacent to it obliquely to the longitudinal direction of said crash box. The support elements of this conventional arrangement substantially have the shape of plates, on which ribs extend for stiffening, and each of which have angled end pieces at a front or rear edge facing the bumper cross member or the crash box. The end pieces contact the bumper cross member or a side wall of the crash box and are fastened to these through bolts. When the support elements during a collision are loaded with a minor overlap, forces between them and the bumper cross member or the crash box can be substantially transmitted only via the bolts. Because of this, the force transmission is concentrated on small wall regions of the crash box, and a correspondingly high wall thickness is required in order to avoid tearing-out of the bolts and as a consequence rendering the support elements inactive. The support elements can substantially yield to loading only through buckling and yielding in lateral direction. However, as soon as a support element starts to buckle it can only put up minor resistance to deformation, so that the amount of energy which can be absorbed by the support element is small relative to the quantity of material employed.

SUMMARY

A bumper arrangement is disclosed herein which is capable of absorbing a large amount of collision energy during a collision even with low overlap. According to a configuration of the present disclosure, the bumper arrangement includes at least one crash box, which extends in a longitudinal direction, also called vehicle longitudinal direction in the following and a front end of which is fastened to a bumper cross member. At least one support element extends along an outside of the crash box obliquely to the longitudinal direction. A connection portion is anchored on the crash box and, with respect to the longitudinal direction, at least on the middle region of the support element. By rendering buckling and lateral yielding of the support element more difficult, the connection portion forces the compression of the support element, through which a large amount of the collision energy can be consumed.

A particularly efficient production of the bumper arrangement is possible when the connection portion is extruded in combination with either the crash box or the support element, and preferably the crash box. On the respective other element, the connection portion can be anchored in particular through welding, screwing or riveting. The connection portion can include at least one plate extending in the vehicle longitudinal direction. On such a plate, the respective other element can be anchored along a continuous line or on multiple points.

According to the orientation of the support element obliquely to the longitudinal direction of the crash box, the width of the plate can decrease from the bumper cross member in the longitudinal direction and the respective other element extends along an edge of the plate facing away from the one element. The connection portion can in particular include two plates. Because of this, the possibility in particular of an arrangement is created, in which the one of the plates is anchored contacting a top side and the other plate a bottom side of the other element. When the plates extend in a same plane with an upper or a lower wall of the one element, particularly high forces can be transmitted in transverse direction without deforming the one element in transverse direction.

Since the plate, in the event of a collision, substantially has to absorb only forces in transverse direction while longitudinal forces are substantially absorbed by the crash box and the support element, the plate can have a thinner wall thickness than the respective element with which it is unitarily formed. Such different wall thicknesses can be easily realized in particular through extruding. The other element, too, which is not unitary with the connection portion, can be practically formed as an extruded section. In order to increase the amount of energy that can be removed during a collision, the support element and/or the crash box can be stiffened through at least one intermediate wall between two hollow spaces.

According to a further configuration of the present disclosure, a method for producing a bumper arrangement, in particular the bumper arrangement described above is disclosed. The method includes: (i) extruding a crash box in combination with a connection portion; (ii) arranging of a support element obliquely to the longitudinal direction of the crash box along an outside of the crash box; (iii) anchoring of the support element on the connection portion; and (iv) fastening of a bumper cross member to the front ends of the support element and the crash box. Alternatively, the a method for producing a bumper arrangement includes: (i) extruding of a support element in combination with a connection portion; (ii) arranging of the support element around an outside of a crash box obliquely to its longitudinal direction; (iii) anchoring of the support element on the crash box; and (iv) fastening of a bumper cross member on front ends of the support element and the crash box.

In order to obtain at least one plate as connection portion, the width of which decreases from the bumper cross member in the longitudinal direction, the connection portion obtained through extrusion can be trimmed.

BRIEF DESCRIPTION OF THE DRAWINGS

The present disclosure will hereinafter be described in conjunction with the following drawing figures, wherein like numerals denote like elements, and:

FIG. 3 shows one of the two extruded section pieces in the trimmed state;

FIG. 4 shows the extruded section pieces connected to one another;

FIG. 5 shows an alternative cross section of one of the extruded sections;

FIG. 6 shows a rear termination flange, which can be joined to the extruded section pieces in order to create a connection to a body side member, FIG. 7 shows a plug-in sleeve, which according to an alternative configuration can be connected to the extruded section pieces in order to make possible the attachment to a side member;

FIG. 8 shows a partial top view of a bumper arrangement and a side member of a vehicle side member body; and FIG. 9 shows an extruded section piece according to a further configuration.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
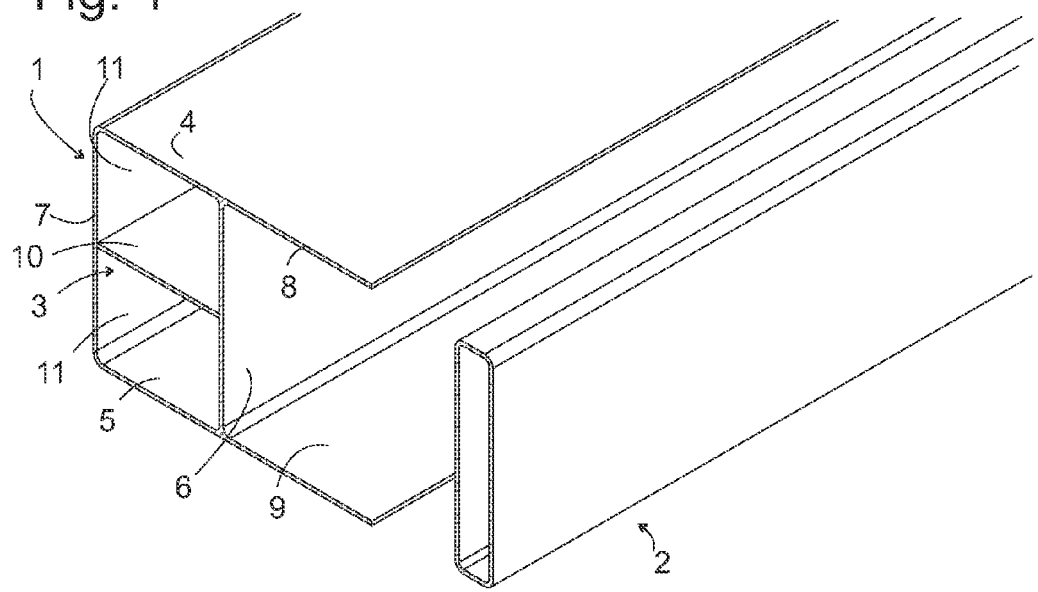
FIG. 1 shows two extruded sections used for producing the bumper arrangement.

FIG. 1 shows two extruded sections 1, 2 of steel, light metal or the like in a perspective view, which are employed for producing the bumper arrangement according to the present disclosure. The extruded section 1 with the larger cross section is provided for producing a crash box; its cross section includes a rectangle, which will form the actual crash box 3 with upper and lower walls 4, 5 and an outer side wall 6 and an inner side wall 7 later on. In a state in which it is mounted in the vehicle, the outer side wall 6 faces an adjacent fender, the inner side wall 7 faces an engine compartment. The upper and lower wall 4, 5 are extended sideways beyond the outer side wall 6 through plates 8, 9.

The extruded section 1 can furthermore include one or multiple intermediate walls 10, which subdivide the interior of the extruded section 1 into multiple elongated hollow spaces 11 and which, by connecting outer walls of the crash box 3 located opposite one another, in this case the side walls 6, 7, to one another, stiffen the crash box 3.

Like the crash box 3, the second extruded section 2 in this case has a rectangular cross section, even though with smaller dimensions. The width of the extruded section 2 is significantly smaller than the crash box 3; its height is dimensioned in order to exactly fill out the intermediate space between the plates 8, 9.

Figure 2:
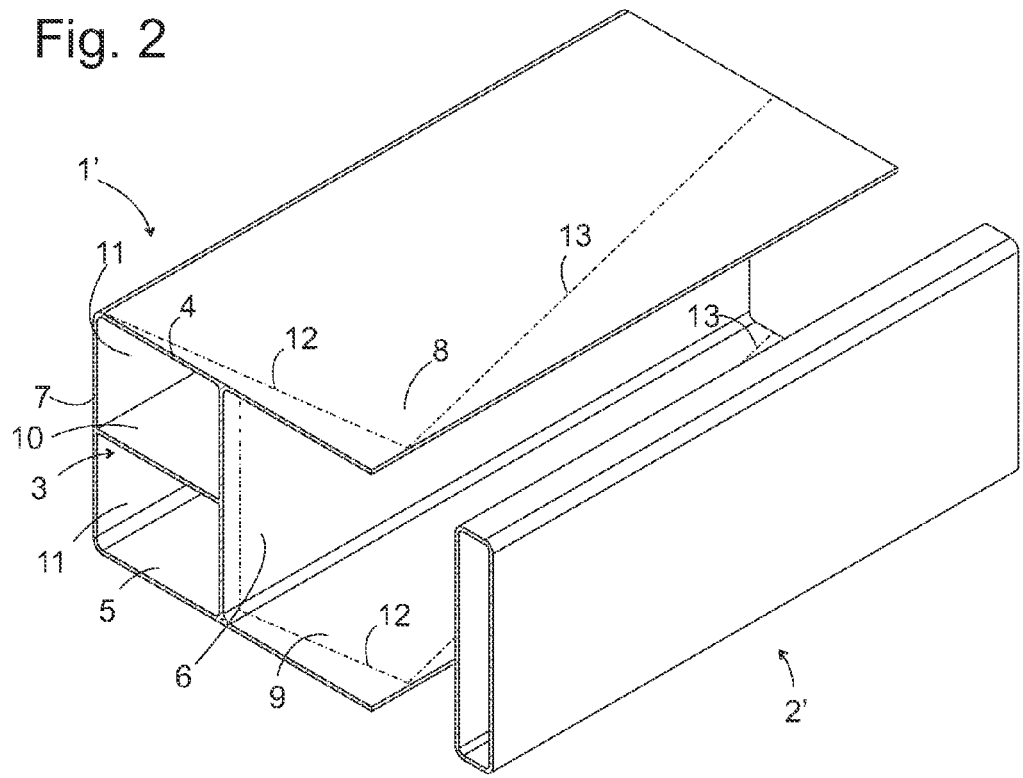
FIG. 2 shows pieces of the extruded sections cut to size.

FIG. 2 shows two pieces 1', 2' of the extruded sections 1, 2 each cut to size in the length required for producing the bumper arrangement. On the extruded section piece 1', dash-dotted lines 12, 13 describe planes, along which the extruded section piece 1' is to be trimmed in a following step. The course of the front line 12 depends on the contour of a bumper cross member 26, which is to be joined up along this line 12 later on. The line 13 runs from a lateral edge of the plate 8 obliquely inwardly to a rear end of the section piece 1' and is dimensioned so that the width of the plates 8, 9 even at this rear end is still adequate in order to provide support for the section piece 2'—in the following also described as support element 2'—between them.

FIG. 3 shows the finish-trimmed extruded section piece 1'.

In a following step, the support element 2' is inserted between the plates as seen in FIG. 4. In the case under consideration here, the support element 2' is pushed in between the plates 8, 9 so far that of an upper and lower wall 14, 15 of the support element 2' a narrow rest each is not covered by the plates 8, 9. Thus, the walls 14, 15 each form a fillet radius 16 with the edges of the plates, along which the section pieces 1', 2' can be welded or soldered to one another. Alternatively, the walls 14, 15 of the extruded section 2 can also be screwed or riveted to the plates 8, 9, as indicated in FIG. 4 through screw holes 17. At least one of these screw holes 17 should be located in a middle region of the section pieces 1', 2', distant both from the front as well as from the rear end in order to prevent breaking-out of the support element 2' in lateral direction subject to a compression loading.

FIG. 5 shows an alternative cross section of the extruded section 2. As is shown in the preceding figures for the crash box 3, the extruded section 2 can also be stiffened through one or multiple intermediate walls 18.

FIG. 6 shows a flange 19, which in a configuration of the bumper arrangement can be welded to the rear end of the section piece 1' in order to make possible fastening to a flange of a side member which is complementary to the flange 19 by screwing together via screw holes 20. The region of the flange 19, to which the section piece 1' is welded, is drawn in as a dashed outline 21 in FIG. 6. An outline corresponding to the support element 2' is likewise drawn onto the flange 19 in dashed line, but in general the support element 2' however is not fastened directly to the flange 19, but only indirectly via the section piece 1'.

FIG. 7 shows a plug-in sleeve 22, which according to an alternative configuration can serve for anchoring the bumper arrangement 3 on a side member 25 of a motor vehicle body. The plug-in sleeve 22 has a cross section which is substantially rectangular here, which is dimensioned in order to engage into the hollow spaces 11 of the extruded section piece 1' with a minor spacing to its walls 4, 5, 6, 7. Notches 23 on a front end of the plug-in sleeve 22 are provided in order to receive the intermediate wall 10. There contact with the bottom of the notches 23 defines a stop position, up to which the plug-in sleeve 22 can be pushed into the section piece 1'. In this stop position, plug-in sleeve 22 and extruded section 1 are welded or soldered to one another.

In FIG. 8 the bumper assembly 24 includes the plug-in sleeve 22 joined with the section piece 1' and the support element 2' and assembled together with a front end of a side member 25 and a piece of a bumper cross member 26. The free rear end of the plug-in sleeve 22 is provided in order to be pushed into an open face end 27 of the side member 25 and to be fastened therein with the help of screws 28, which penetrate the screw holes 29 (see FIG. 7) of the plug-in sleeve 22 and holes in the side walls of the side member 25 which are aligned with these. Slits 30 on top and bottom side of the plug-in sleeve 22 make possible expanding the plug-in sleeve 22 under the tension of the screws 29 and contact with the side walls of the side member 25 over a large area.

The course of the line 12 has been adapted to the shape of the bumper cross member 26 so that when assemblies 24 are mounted on both side members 25 of the vehicle body which are arranged in mirror image with respect to one another, regions 31 on the back of the bumper cross member 26 can be placed and fastened flat against the front ends of both assemblies 24. Fastening can be effected through direct welding of the bumper cross member 26 to the assemblies 24, but it is also conceivable analogously to the flange shown in FIG. 6 to mount a flange to the front end of the assembly, which can be screwed to a complementary flange of the bumper cross member 26.

When a vehicle equipped with a bumper arrangement which is obtained by fastening the assemblies 24 to the bumper cross member 26 collides with an obstacle 32 which is far offset against the vehicle center as in FIG. 8, mainly an end portion 33 of the bumper cross member 26 which laterally projects over the outer side wall 6 of the extruded section piece 1' is exposed to severe loading. The support element 2' prevents the end portion 33 from moving towards the back and against the side wall 6 under the pressure of the obstacle 32. Since the support element 2' is fastened distributed over its entire length to the plates 8, 9 of the extruded section piece 1', it cannot buckle and laterally break out towards the outside under the pressure of the obstacle 32. Instead, both the crash box 3 as well as the plates 8, 9 of the extruded section piece 1' and the support element 2' are jointly compressed subject to forming a large number of closely-spaced folds, so that even in the case of a collision with little overlap a large amount of collision energy can be consumed.

FIG. 9 shows a variant of the extruded section piece 1' in a perspective view. The support element 2' which is not shown in the Figure is also inserted and fastened between the plates 8, 9 in this case. The crash box 3 in this case is extended beyond the rear edges of the plates 8, 9 and the support element 2' in order to form an insert portion 34, which, as described above for the plug-in sleeve 22, can be inserted into the side member 1 and screwed to the latter.

It is to be understood that the above detailed description and the drawings represent certain exemplary configurations of the present disclosure but that these are only intended for illustration and should not be interpreted as being restrictive regarding the scope of the present disclosure. Various modifications of the described configurations are possible without leaving the scope of the following claims and their range of equivalence. In particular, this description and the figures also show exemplary embodiments which are not mentioned in the claims. Such features can also occur in combinations other than those specifically disclosed here. The fact that multiple such features are mentioned together in a same sentence or in another type of context does not therefore justify the conclusion that these can only occur in the specific combination disclosed; instead, it must be assumed in principle that of multiple such features individual ones can also be omitted or modified provided this does not question the functionality of the present disclosure.

What is claimed is:

1. A bumper attachment member for interconnecting a bumper cross member to a rail extending in a longitudinal direction, the bumper attachment member comprising:
   at least one crash box which extends in the longitudinal direction and having a front end configured to be fastened to the bumper cross member;
   at least one support element extending along an outside of the crash box obliquely to the longitudinal direction;
   a connection portion extending between the crash box and the support element; and
   a sleeve configured to secure the crush box to the rail, the sleeve having a first end received the rear end of the crush box, a stop positively location the sleeve within the crush box and a second end extending therefrom.

2. The bumper attachment member according to claim 1, wherein the connection portion is extruded as part of either the crash box or the support element.

3. The bumper attachment member according to claim 2 wherein the connection portion is extruded as part of the crash box.

4. The bumper attachment member according to claim 3 wherein the support element is secured to the connection portion.

5. The bumper attachment member according to claim 1 wherein the connection portion comprises at least one plate extending in the vehicle longitudinal direction.

6. The bumper attachment member according to claim 1 wherein the connection portion comprises two plates extending in the vehicle longitudinal direction.

7. The bumper attachment member according to claim 6, wherein the width of the plate decreases from the front end to the rear and the support element extends along an edge of the plate opposite crash box.

8. The bumper attachment member according to claim 6, wherein a first plate one is secured to a first side of the support element and a second plate is secured to a second side of the support element.

9. The bumper attachment member according to claim 8, wherein the first plate extends in a common plane with a first wall on the crash box and the second plate extends in a common plane with a second wall on the crash box.

10. The bumper attachment member according to claim 6 wherein a wall thickness of the plates is less than the wall thickness of at least one of the crash box and the support member.

11. The bumper attachment member according to claim 1 wherein the crash box and the connection portion are extruded as a first part and the support member is extruded as a second part.

12. The bumper attachment member according to claim 1 wherein the crash box further comprises at least one intermediate wall forming at least two interior cells separated by the intermediate wall.

13. The bumper attachment member according to claim 1 wherein the support element further comprises at least one intermediate wall forming at least two interior cells separated by the intermediate wall.

14. A bumper attachment member for interconnecting a bumper cross member to a rail extending in a longitudinal direction, the bumper attachment member comprising:
   a crash box defined by a pair of vertical wall sections and a pair of lateral wall sections and firming at least one hollow space therebetween, the crash box extending in the longitudinal direction, a front end configured to be fastened to the bumper cross member, and a rear end configured to be fastened to the rail, wherein a portion of the pair of lateral wall sections extend laterally beyond one of the vertical wall sections and taper from the front end to the rear end; and
   a support member extending vertically between the laterally extending portions of the pair of lateral wall portions obliquely to a least one of the pair of vertical wall sections in the longitudinal direction.

15. The bumper attachment member according to claim 14 wherein the crash box further comprises a wall thickness of the portion extending laterally beyond one of the vertical wall sections is less than the wall thickness of the pair of lateral sections extending between the pair of vertical wall sections.

16. The bumper attachment member according to claim 14 wherein the crash box further comprises at least one intermediate wall extending between the pair of vertical wall sections and forming at least two interior cells separated by the intermediate wall.

17. The bumper attachment member according to claim 14 wherein the support element further comprises at least one intermediate wall forming at least two interior cells separated by the intermediate wall.

18. The bumper attachment member according to claim 14 further comprising a sleeve configured to secure the crush box to the rail, the sleeve having a first end received the rear end of the crush box, a stop positively locating the sleeve within the crush box and a second end extending therefrom.

19. A bumper attachment member for interconnecting a bumper cross member to a rail extending in a longitudinal direction, the bumper attachment member comprising:
- at least one crash box which extends in the longitudinal direction and having a front end configured to be fastened to the bumper cross member;
- at least one support element extending along an outside of the crash box obliquely to the longitudinal direction;
- a connection portion extending between the crash box and the support element,
- wherein the connection portion comprises two plates extending in the vehicle longitudinal direction and a wall thickness of the plates is less than the wall thickness of at least one of the crash box and the support member.

* * * * *